US012555086B2

(12) United States Patent
Gabriele et al.

(10) Patent No.: US 12,555,086 B2
(45) Date of Patent: Feb. 17, 2026

(54) SYSTEMS AND METHODS FOR A USER INTERFACE FOR MAKING RECOMMENDATIONS

(71) Applicant: Capital One Services, LLC, McLean, VA (US)

(72) Inventors: David Gabriele, Chicago, IL (US); George Bergeron, Falls Church, VA (US); Adam Vukich, Springfield, VA (US); Vu Nguyen, Pittsburg, CA (US); Andrea Montealegre, Arlington, VA (US); Ljubica Chatman, New York, NY (US); Mykhaylo Bulgakov, Arlington, VA (US); Joshua Edwards, Carrollton, TX (US); Abdelkader Benkreira, Washington, DC (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 2 days.

(21) Appl. No.: 18/222,791

(22) Filed: Jul. 17, 2023

(65) Prior Publication Data
US 2024/0062180 A1    Feb. 22, 2024

Related U.S. Application Data

(63) Continuation of application No. 16/904,115, filed on Jun. 17, 2020, now Pat. No. 11,748,727.

(51) Int. Cl.
G06Q 20/20    (2012.01)
G06N 20/00    (2019.01)
(Continued)

(52) U.S. Cl.
CPC .......... *G06Q 20/204* (2013.01); *G06N 20/00* (2019.01); *G06Q 20/227* (2013.01); *G06Q 20/387* (2013.01)

(58) Field of Classification Search
CPC .. G06Q 20/204; G06Q 20/227; G06Q 20/387; G06Q 20/389; G06N 20/00
See application file for complete search history.

(56) References Cited

U.S. PATENT DOCUMENTS 8,560,447 B1    10/2013 Hinghole et al.
9,757,644 B2    9/2017 Rose
(Continued)

FOREIGN PATENT DOCUMENTS

CA    3035034 A1 *  10/2019  ............ H04W 4/80

*Primary Examiner* — Peter Ludwig
(74) *Attorney, Agent, or Firm* — HUNTON ANDREWS KURTH LLP

(57) ABSTRACT

A system includes an application programming interface, a database, and a server. The application programming interface can make recommendations to a user at a point of sale to display a recommended payment method from a set of payment methods associated with the user. The database can store past transactions for each payment method in the set of payment methods. The server can generate payment analytics by analyzing the past transactions in the database for each payment method. The server can determine potential benefits available to the user. The server can determine the recommended payment method by using the payment analytics and maximizing the potential benefits available to the user.

11 Claims, 11 Drawing Sheets

(51) Int. Cl.
*G06Q 20/22* (2012.01)
*G06Q 20/38* (2012.01)

(56) References Cited

U.S. PATENT DOCUMENTS

| | | | |
|---|---|---|---|
| 10,614,451 B2 | 4/2020 | Novis | |
| 2004/0019543 A1 | 1/2004 | Blagg et al. | |
| 2010/0191594 A1 | 7/2010 | White et al. | |
| 2012/0004964 A1 | 1/2012 | Satyavolu et al. | |
| 2012/0004965 A1 | 1/2012 | Satyavolu et al. | |
| 2012/0004966 A1 | 1/2012 | Satyavolu et al. | |
| 2012/0004967 A1 | 1/2012 | Satyavolu et al. | |
| 2012/0004969 A1 | 1/2012 | Satyavolu et al. | |
| 2012/0004970 A1 | 1/2012 | Satyavolu et al. | |
| 2012/0004975 A1 | 1/2012 | Satyavolu et al. | |
| 2012/0010932 A1 | 1/2012 | Satyavolu et al. | |
| 2012/0010933 A1 | 1/2012 | Satyavolu et al. | |
| 2012/0010936 A1 | 1/2012 | Satyavolu et al. | |
| 2012/0053987 A1 | 3/2012 | Satyavolu et al. | |
| 2013/0024371 A1* | 1/2013 | Hariramani | G06Q 20/384 705/41 |
| 2013/0262291 A1 | 10/2013 | Ricci | |
| 2013/0325548 A1 | 12/2013 | Kulkarni et al. | |
| 2013/0325587 A1 | 12/2013 | Kothari et al. | |
| 2013/0325599 A1 | 12/2013 | Yeri et al. | |
| 2013/0325608 A1 | 12/2013 | Kulkarni et al. | |
| 2013/0325667 A1 | 12/2013 | Satyavolu et al. | |
| 2013/0325680 A1 | 12/2013 | Satyavolu et al. | |
| 2013/0325681 A1 | 12/2013 | Somashekar et al. | |
| 2014/0136309 A1* | 5/2014 | Goldman | G06Q 30/0226 705/16 |
| 2014/0136353 A1 | 5/2014 | Goldman et al. | |
| 2014/0172560 A1 | 6/2014 | Satyavolu et al. | |
| 2014/0180783 A1 | 6/2014 | Satyavolu et al. | |
| 2015/0220999 A1 | 8/2015 | Thornton et al. | |
| 2015/0332306 A1 | 11/2015 | Marks et al. | |
| 2016/0005072 A1 | 1/2016 | Robinson | |
| 2016/0071200 A1 | 3/2016 | Lee et al. | |
| 2016/0232546 A1 | 8/2016 | Ranft et al. | |
| 2018/0143989 A1 | 5/2018 | Nomula et al. | |
| 2018/0181956 A1* | 6/2018 | Zarakas | G06Q 20/325 |
| 2019/0228397 A1 | 7/2019 | Madden | |
| 2020/0279288 A1 | 9/2020 | Song | |
| 2021/0027357 A1 | 1/2021 | Bonfigli et al. | |
| 2021/0049638 A1* | 2/2021 | Behravesh | G06Q 20/405 |
| 2021/0158413 A1 | 5/2021 | Kello et al. | |
| 2021/0192496 A1* | 6/2021 | Gregovic | G06N 20/20 |
| 2021/0201316 A1* | 7/2021 | Lunceford | G06Q 20/401 |
| 2022/0092627 A1* | 3/2022 | Woodrick | G06Q 30/0208 |

* cited by examiner

100

SYSTEMS AND METHODS FOR A USER INTERFACE FOR MAKING RECOMMENDATIONS

CROSS-REFERENCE TO RELATED APPLICATION

The subject application is a continuation of U.S. patent application Ser. No. 16/904,115 filed Jun. 17, 2020, now U.S. Pat. No. 11,748,727, the contents of which is hereby incorporated by reference in its entirety.

FIELD OF THE DISCLOSURE

The present disclosure generally relates to artificial intelligence and user interfaces and, in particular, to systems and methods for a user interface for making recommendations.

BACKGROUND

Consumers are in a great position where they can choose from highly competitive offers from many credit card issuers competing for their business. With so many credit card issuers enticing new cardholders with sign-up bonuses, cash-back rewards and various types of rewards points, it can be hard for consumers to keep track of when and where to look to earn their benefits. Many consumers do not fully understand the rules or read the fine print. Credit card rewards can be an easy way to get more value out of every purchase a consumer makes, but only if the rewards exceed the costs. For some consumers, the money and time that a rewards card requires may be more trouble than the benefit is worth. When a consumer has multiple different cards with different rules and different kinds of benefits, it is hard to keep track of it all. It takes a level of sophistication and focus that the typical consumer doesn't have. Consumers often are not able to determine which payment method is most efficient, when faced with a payment opportunity. Accordingly, there are significant, and competing, needs for systems and methods for a user interface for making recommendations at a point of sale for the best payment method to maximize their benefits.

SUMMARY

The disclosed subject matter is directed to systems and methods for a user interface to make payment method recommendations that satisfy these needs.

An example embodiment of the present disclosure can be a system including an application programming interface, a database, and a server. The application programming interface can make a recommendation to a user at a point of sale to display a recommended payment method from a set of payment methods associated with the user. The database can store past transactions for each payment method in the set of payment methods. The server can generate payment analytics by analyzing the past transactions in the database for each payment method. The server can determine potential benefits available to the user. The server can determine the recommended payment method by using the payment analytics and maximizing the potential benefits available to the user. The recommended payment method can include a virtual number. The set of payment methods can be one or more of: a credit card, a bank account, cash, a check, or a debit card. The potential benefits available to the user can be selected from one or more of: a number of reward points, cash back, a number of airline miles, a donation to a charity, or an interest rate. The potential benefits available to the user can be stored in a customer profile that is stored in the database. The application programming interface can receive session information about the user. The application programming interface can store information about the user in a cache. The cache can store one or more predetermined recommended payment methods associated with one or more websites.

An example embodiment of the present disclosure can be a method. Conditions for potential benefits for a user can be matched to transactions for a set of payment methods associated with the user. A recommended payment method can be determined that maximizes the potential benefits for the user. A virtual number can be generated for the recommended payment method. An application programming interface can be provided for making a recommendation to the user at a point of sale to provide the recommended payment method and the virtual number to the user. The transactions can be filtered based on one or more expired time periods of potential benefits to the user. The filtered transactions can be provided to a machine learning program. The recommended payment method can be generated using the machine learning program. The set of payment methods can be one or more of: a credit card, a bank account, cash, a check, or a debit card. The potential benefits available to the user can be selected from one or more of: a number of reward points, cash back, a number of airline miles, a donation to a charity, or an interest rate. The recommended payment method can be predicted for one or more potential points of sale. The recommended payment methods can be stored for the potential points of sale. The set of payment methods for the user can be received and the transactions for the set of payment methods can be stored. The application programming interface can provide the potential points of sale. The transactions can include the potential points of sale. The recommended payment method can maximize spend potential. Spend potential can be maximized by analyzing the transactions and the potential points of sale.

An example embodiment of the present disclosure can be a non-transitory computer-accessible medium having stored thereon computer-executable instructions for making a recommendation to a user at a point of sale, wherein upon execution by a computer arrangement comprising a processor, the instructions cause the computer arrangement to perform a method. The method can provide an application programming interface that makes a recommendation to a user at a point of sale to provide a recommended payment method and to provide a virtual number. The recommended payment method can maximizes the potential benefits to the user. The potential benefits can be selected from one or more of: a number of reward points, cash back, a number of airline miles, a donation to a charity, or an interest rate. The component can be configured to receive a set of payment methods associated with the user. The set of payment methods can be one or more of: a credit card, a bank account, cash, a check, or a debit card. The component can receive and store transactions for the set of payment methods and potential points of sale in a database. The component can filter the transactions based on one or more expired time periods of potential benefits to the user. The component can match conditions for the potential benefits to the filtered transactions by using a machine learning program. The component can generate the recommended payment method by using the machine learning program to maximize spend potential. The component can predict the recommended payment method for the potential points of sale using the machine learning program to maximize spend potential. The component can store the recommended payment method for the potential points of sale.

These and other features, aspects and advantages of the disclosed subject matter are explained in greater detail with reference to specific example embodiments that are illustrated in the following description, appended claims, and accompanying drawings, in which like elements are indicated with like reference designators.

DETAILED DESCRIPTION OF EXAMPLE EMBODIMENTS

The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

Figure 1:
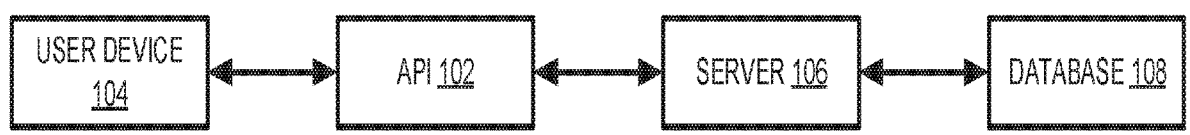
FIG. 1 is a diagram of a system for making recommendations to a user for payment methods, according to an example embodiment of the disclosure.

FIG. 1 is a diagram of a system 100 for making a recommendation to a user for payment methods, according to an example embodiment of the disclosure. System 100 includes an application programming interface (API) 102, a user device 104, a server 106 and a database 108. API 102 can provide a user interface for display on user device 104. User device 104, server 106, and database 108 can be network-enabled computers connected to one or more networks. User device 104 can be in data communication with server 106 through API 102 to receive the payment method recommendation and make a recommendation to the user using the user interface displayed on user device 104. Server 106 can access database 108 in connection with determining the payment method recommendation for the user. API 102 can be provided by server 106 to user device 104 for providing the user interface on user device 104.

API 102 can be any kind and number of application programming interfaces that are configured to provide a user interface that makes a recommendation to the user at a point of sale to display a recommended payment method from a set of payment methods associated with the user. The point of sale can be any time and place where a transaction is completed such as where a website or mobile application processes a digital payment. The set of payment methods can be any kind of payment method such as credit cards, bank accounts, cash, checks, and/or debit cards. The recommended payment method can include a virtual number. The virtual number can be a virtual credit card number that the user can use to pay for an online purchase without disclosing the real credit card information, which helps prevent fraud. The virtual account number along with other information (e.g., amount of purchase or other merchant or transaction specific information) can be used by server 106 to identify the real card holder's credit card account or other kind of account.

User device 104 can include a browser that is a software application for navigating websites on a network, such as Google Chrome®, Firefox®, Safari®, or Internet Explorer®. API 102 can be a browser extension and/or part of a mobile or web application associated with server 106. API 102 can receive browser session information about the user from the browser on user device 104. API 102 can store information about the user in a cache on user device 104. The cache can store predetermined recommended payment methods associated with websites. API 102 can include a way to collect the user's payment methods and websites where payment methods may be used. Server 106 can access information stored in database 108 to retrieve the user's payment methods and websites and provide this information to user device 194 via API 102. API 102 can include a dashboard user interface for managing payment methods and maximizing benefits or this information can be provided on a separate website by server 106.

Server 106 can generate payment analytics by analyzing the past transactions stored in database 108 for each payment method. The payment analytics can be any kind of data discovery, interpretation, or communication of patterns in data about user transactions and may be the result of applying artificial intelligence applications. The data about past transactions can be from any kind of source, such as bank account information. Server 106 can determine potential benefits available to the user based on information about the payment methods such as payment method rules, advertising, and business logic. Server 106 can determine the recommended payment method by using the payment analytics and maximizing the potential benefits available to the user. The potential benefits available to the user can anything of value such as reward points, airline miles, donations to charities, and/or interest rates associated with user accounts. The potential benefits available to the user can be stored in a customer profile that is stored in database 108 or in a cache on user device 104.

Database 108 can be part of server 106 or a separate network-enabled computer. Database 108 can store past transactions for each payment method in the set of payment methods for the user. Database 108 is any organized collection of data such as a database management system.

As referred to herein, a network-enabled computer may include, but is not limited to a computer device, or communications device including, e.g., a server, a network appliance, a personal computer, a workstation, a phone, a handheld PC, a personal digital assistant, a thin client, a fat client, an Internet browser, a mobile device, or other device. For example, a mobile device may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

A network-enabled computer can include a processor and a memory, and it is understood that the processing circuitry may contain additional components, including processors, memories, error and parity/CRC checkers, data encoders, anti-collision algorithms, controllers, command decoders, security primitives and tamper-proofing hardware, as necessary to perform the functions described herein.

A network-enabled computer can include a display and input devices. The display can be any type of device for presenting visual information such as a computer monitor, a flat panel display, and a mobile device screen, including liquid crystal displays, light-emitting diode displays, plasma panels, and cathode ray tube displays. The input devices can include any device for entering information into the user's device that is available and supported by the user's device, such as a touch-screen, keyboard, mouse, cursor-control device, touch-screen, microphone, digital camera, video recorder or camcorder. These devices can be used to enter information and interact with the software and other devices described herein. In some examples, the network-enabled computer can execute one or more applications, such as software applications, that enable, for example, network communications with one or more components of the system and transmit and/or receive data.

A network-enabled computer can be a client device in communication with one or more servers via one or more networks, and can operate as a respective front-end to back-end pair with the server. A client device can transmit, for example from a mobile device application executing on the client device, one or more requests to the server. The one or more requests can be associated with retrieving data from the server. The server can receive the one or more requests from the client device. Based on the one or more requests from the client device, the server can be configured to retrieve the requested data from one or more databases. Based on receipt of the requested data from the one or more databases, the server can be configured to transmit the received data to the client device. For example, the received data can be responsive to one or more requests.

The network can be one or more of a wireless network, a wired network or any combination of wireless network and wired network, and can be configured to connect the client device to the server. For example, the network can include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

The network can include, without limitation, telephone lines, fiber optics, IEEE Ethernet 902.3, a wide area network, a wireless personal area network, a LAN, or a global network such as the Internet. The network can support an Internet network, a wireless communication network, a cellular network, or the like, or any combination thereof. The network can further include one network, or any number of the exemplary types of networks mentioned above, operating as a stand-alone network or in cooperation with each other. The network can utilize one or more protocols of one or more network elements to which they are communicatively coupled. The network can translate to or from other protocols to one or more protocols of network devices. Although the network is depicted as a single network, it should be appreciated that according to one or more examples, the network can comprise any number of interconnected networks, such as, for example, the Internet, a service provider's network, a cable television network, corporate networks, such as credit card association networks, and home networks.

Figure 2:
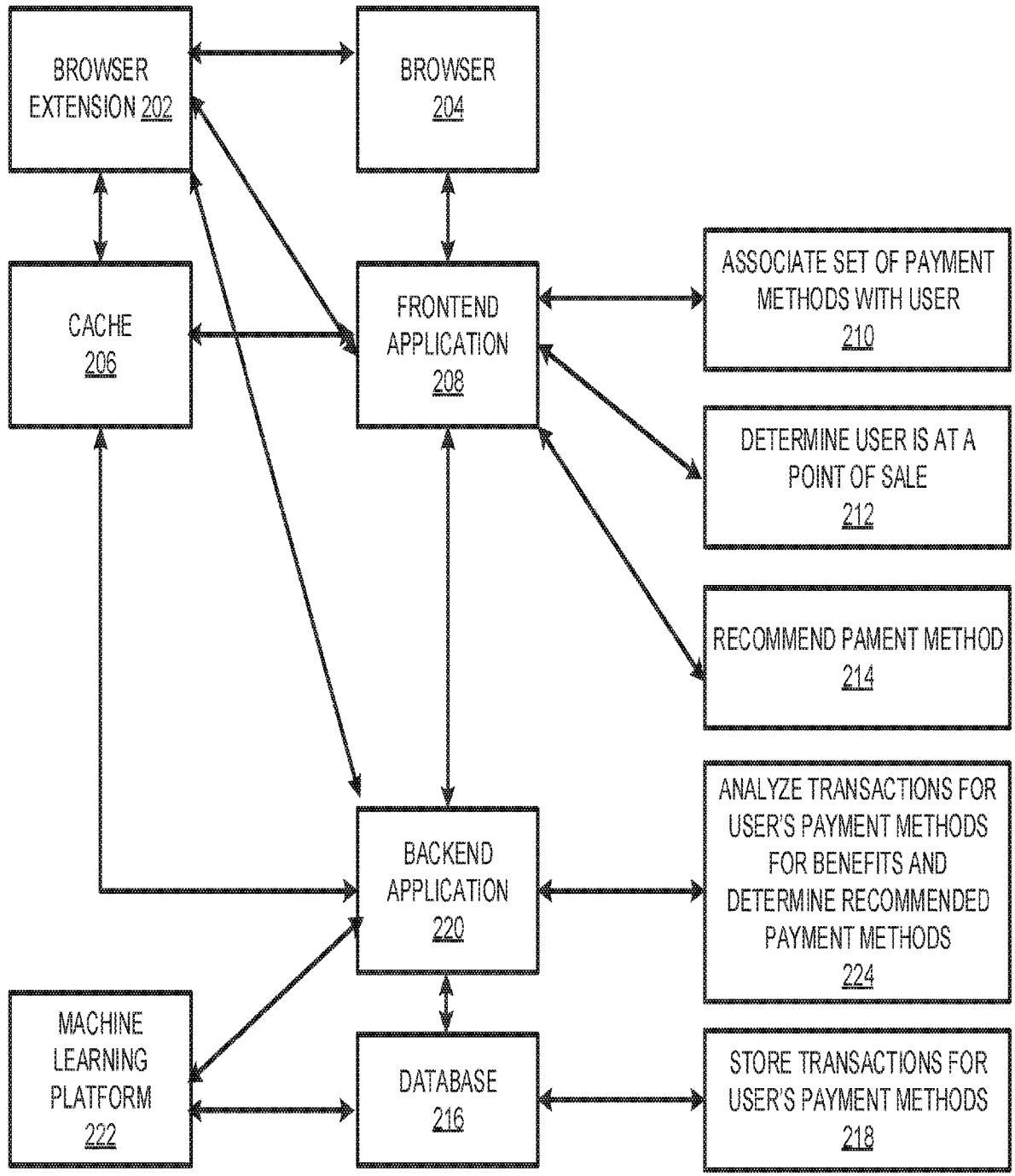
FIG. 2 is a diagram of a system for making a recommendation to a user for payment methods, according to an example embodiment of the disclosure.

FIG. 2 is a diagram of a system 200 for making a recommendation to a user for payment methods, according to an example embodiment of the disclosure. System 200 includes a browser extension 202, a browser 204, a cache 206, a frontend application 208, a backend application 220, a machine learning platform 222, and a database 216. System 200 can be configured to display a user interface on a client device for a web or mobile application that makes payment method recommendations. The client device can be configured with the user interface to the application provided by a server. The client device can include cache 206. The client device can be further configured with browser 204 and browser extension 202. The client device can be in communication with the server that provides the application. The server can be configured to provide various features of the application through frontend application 208 and backend application 220. In addition, the server can be in communication with machine learning platform 222 and database 216 to aid in providing various features. Frontend application 208 can associate a set of payment methods with the user 210, determine when the user is at a point of sale 212, and recommend a payment method 214. Backend application 220 can analyze transactions for the user's payment methods for benefits to the user and determine a recommended payment method 224.

Browser extension 202 can provide a pop-up display that makes a recommendation to a user for payment methods, when the user is at a point of sale at a shopping website on browser 204 on the client device. Browser extension 202 can communicate with browser 204, frontend application 208 and backend application 220 by exchanging messages or using APIs. Browser extension 202 can access information associated with browser 204 such as browsing history, bookmarks, cookies, messaging, email, social media, other extensions and the like. Browser extension 202 can read and write data on frontend application 208 and backend application 220. Browser extension 202 can be in communication with frontend application 208 on the server to determine when the user is at a point of sale. Browser extension 202 and/or frontend application 208 can access data scraped from websites and use matching to key terms or natural language processing to determine when the user is at a point of sale. Browser extension 202 and/or frontend application 208 can look at the actual document object model (DOM) of the merchant's web application and see what the IDs, names, classes, etc. are of the input fields. Browser extension 202 and/or frontend application 208 can also use shopping websites and other information about the user stored in cache 206 and/or database 216 to determine that the user is at a point of sale.

Browser extension 202 can run within browser 204 and in the background with frontend application 208 and backend application 220. Browser extension 202 can receive the recommended payment method from communication with frontend application 208 and/or backend application 220. Browser extension 202 can provide information about the user and browser 204 to frontend application 208 and/or backend application 220 to facilitate the determination of the recommended payment method. For example, browser extension 202 can provide the domain name of the website, accepted payment methods on a website, payment amount, new benefits or promotion information and the like.

Browser 204 can interact with frontend application 208 that, in turn, interacts with backend application 220. Frontend application can run on the client device while backend application 220 can run on the server. Browser extension 202 can be installed in browser 204 on the client device and be configured so that a pop-up display makes recommendations to the user at a point of sale for payment methods. Browser 204 can provide information to browser extension 202 such as information about the session, browsing history, bookmarks, cookies, messaging, email, social media, information from other extensions such as data scrapers, and the like.

Cache 206 can be any kind of storage device accessible by the client device and the server. Browser extension 202, frontend application 208, and backend application 220 can access cache 206.

Frontend application 208 can associate a set of payment methods with the user 210. Frontend application 208 can communicate with backend application 220 to retrieve a stored set of payment methods for the user from database 216. Frontend application 208 can provide a web or mobile application with a user interface on the client device where the user can provide the set of payment methods. The set of payment methods can be stored on the client device, cache, the server, and/or database 216. Database 216 can hold information identifying the user as the account holder for each payment method that can be used for verification and approval purposes by backend application 220 on the server.

Frontend application 208 can determine that the user is at a point of sale 212 in cooperation with browser 204, browser extension 202, and/or backend application 220. Frontend application 208 can provide a web or mobile application with a user interface on the client device where the user can provide commonly used websites where payments are made. Frontend application 208 can generate a list of commonly used websites where payments are made from website tracking information received from browser 204, browser extension 202, and/or backend application 220 for the user and/or other users. Frontend application 208 can determine that the user is at a point of sale on a website where payments are made from communications from browser extension 202 or browser 204, looking at the DOM of the application, and/or from scraping data on the website and matching to key words such as "cart", "checkout", "credit card number", "expiration date", etc. While cart and checkout may not be useful as these can occur on the page before the user gets to the actual checkout page, words like "credit card" and its various permutations along with "expiration date" or "expiration month/year" and "CVV" or its permutations can usually be used to determine that the user is at a point of sale. Frontend application 208 can also watch for the user to click on a button or link that says "checkout" or the like and then that the user ends up on a page containing terms likely indicative of a point of sale.

Frontend application 208 can recommend a payment method 214 in cooperation with browser 204, browser extension 202, and/or backend application 220. Frontend application 208 can receive a recommended payment method from backend application 220 and forward the recommended payment method to browser extension 202 in response to a request from browser extension 202. Backend application 220 can respond to a request from browser extension 202 with the recommended payment method. Frontend application 208 or backend application 220 can store the recommended payment method in cache 206 in anticipation of a request so that it can be retrieved, when the user is at the point of sale.

Backend application 220 can analyze transactions for the user's payment methods for benefits and determine the recommended payment method 224. Backend application 220 can access the user's payment methods from cache 206 or database 216 or receive the user's payment methods from frontend application 208 or browser extension 202. Backend application 220 can use machine learning platform 222 to analyze transactions for the user's payment methods. Backend application 220 can find the transactions for each of the user's payment methods, find the rules and procedures for benefits associated with each of the user's payment methods, and determine the recommended payment methods. Backend application 220 can determine a number of recommended payment methods for certain conditions for each of the user's payment methods. Backend application 220 can receive a list of shopping websites where payments can be made using the user's payment methods from frontend application 208 or browser extension 202. Backend application 220 can find shopping websites where payments can be made using the user's payment methods by processing the user's transactions in database 216 or by using machine learning on the machine learning platform 222. Backend application 220 can determine a recommended payment method for each of those shopping websites, store them in database 216 or cache 206, and periodically refresh the recommendations so that they are ready to fetch when the user is at a point of sale on one of those shopping websites. If a new or different point of sale is not in the stored list, backend application 220 can determine a recommended payment method in real time. Browser extension 202, browser 204 or frontend application 208 can notify backend application 220 of potential shopping websites to consider for points of sale where a recommended payment method could be made so that backend application can prepare a recommended payment method in advance.

Machine learning platform 222 can include systems and methods for machine learning techniques and/or predictive modeling to facilitate system 200 in making recommendations to the user for payment methods. Machine learning algorithms can include gradient boosting machine, logistic regression, neural networks, natural language processing, and other artificial intelligence algorithms, or combinations of them. A predictive model can be developed using information about the user and transactions in cache 206 and/or database 216. Machine learning platform 222 can provide predictive models or other results from artificial intelligence processing to backend application 220 to analyze transactions for the user's payment methods for benefits and determine recommended payment methods 224. Machine learning platform 222 can facilitate backend application 220 in responding to requests from frontend application 208 to facilitate associating the set of payment methods with the user 210, determining when the user is at a point of sale 212, or recommending a payment method 214. Machine learning platform 222 can facilitate backend application 220 in responding to requests from browser extension 202 to facilitate making recommendations to the user for payment methods at a point of sale.

Database 215 can be part of a server hosting backend application 220 or a separate network-enabled computer. Database 215 can store past transactions for each payment method in the set of payment methods. Database 215 is any organized collection of data such as a database management system.

Figure 3:
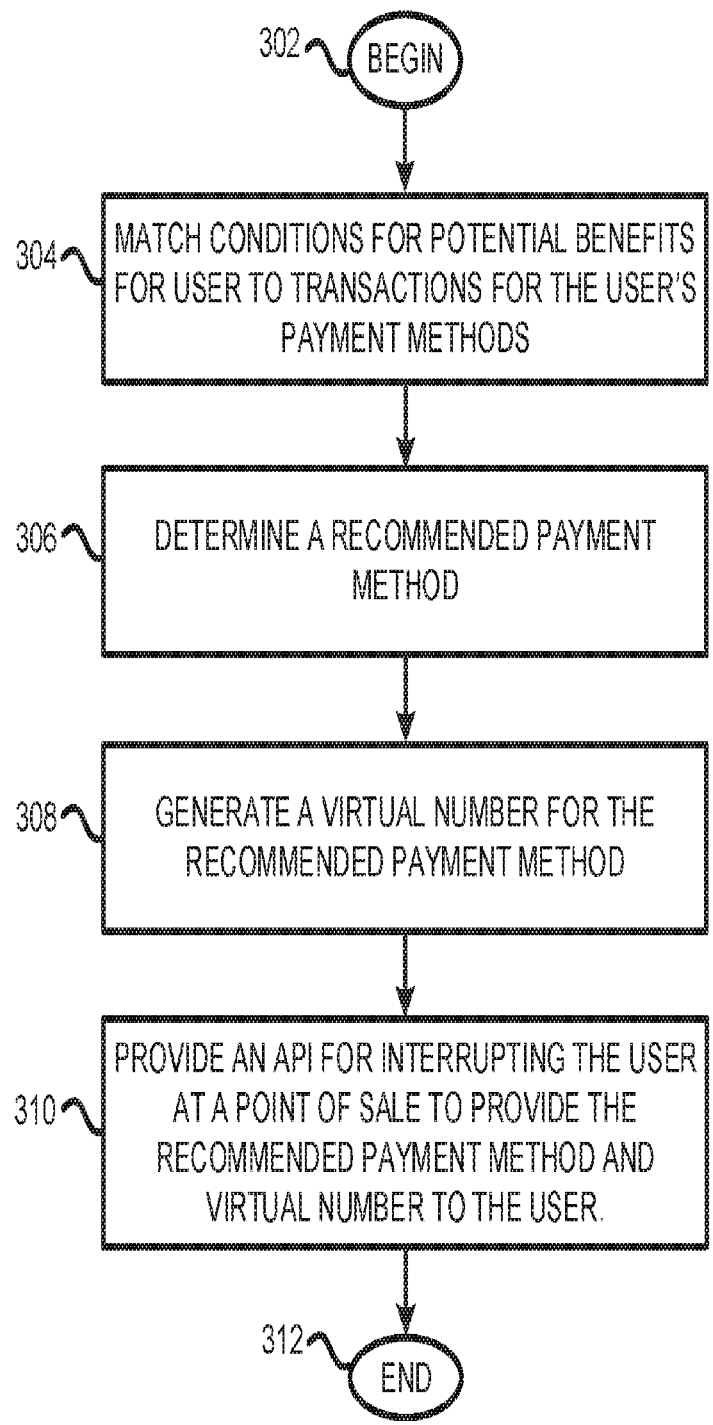
FIG. 3 is a flow chart of a method for making a recommendation to a user for payment methods, according to an example embodiment of the disclosure.

FIG. 3 is a flow chart of a method 300 for making recommendations to a user for payment methods, according to an example embodiment of the disclosure. The most efficient payment method can be determined for the user and the best way to pay for something can be suggested in a user interface displayed on the user's device. For example, when the user is on a payment page in a browser, a browser extension can display a pop-up to recommend the best form of payment for the user. When the user has multiple payment methods, the one with the most benefits can be recommended. When the user is in a store and likely to checkout, a mobile application can show a push notification indicating a payment method recommendation for that store.

Method 300 begins at block 302. At block 304, conditions for potential benefits for the user can be matched to transactions for the set of payment methods associated with the user. The set of payment methods can be one or more of: a credit card, a bank account, cash, a check, or a debit card. The potential benefits available to the user can be one or more of: a number of reward points, cash back, a number of airline miles, a donation to a charity, or an interest rate. Before matching, the user's payment methods, data about how the user is spending their money, and information about benefits associated with the user's payment methods can be collected and stored.

The user's payment methods can be collected and stored in various ways. The user may have a digital payments application such as PayPal®, Apple Pay®, Google Pay®, Samsung Pay®, Virtual Card Numbers with Eno®, Fitbit Pay®, or Garmin Pay®. The payment methods in such applications can be collected and stored through a user interface on the user's device. The user may provide access to one or more accounts at one or more banks or other entities through the user interface. The user may provide access to various other bill payment services associated with certain banks, companies, or services. The user interface can provide ways for the user to manage the payment methods such as adding, deleting, updating, etc. Initially, the user interface can ask the user where they like to use each different payment method and store the information in a profile for the user along with other information, such as transactions for each different payment method.

Data about how the user is spending their money can be collected and stored from many sources. Data can be refreshed as needed for accuracy and completeness. Payment method recommendations can be made based on available data, even if it is inaccurate or incomplete and a user interface can prompt the user to correct inaccuracies or add data. For example, payment recommendations can be made based on other users with similar profiles and/or information about available benefits for known payment methods accepted by a particular merchant. Transactions can be stored from the user's bank for credit cards, debit cards, ATM cards, bank accounts, deposit accounts, checks written, etc. A system for connecting to external financial institutions can be used to collect and store additional transactions and other data. The user can provide additional information about cash or other transactions and desired benefits through a user interface. For example, the user can provide access to websites with financial information such as Mint® or NerdWallet®. Financial information can include bills, budgets, financial goals, credit cards, checking accounts, savings accounts, investment accounts, brokerage accounts, 401k accounts, IRA accounts, auto insurance, credit scores, loans, etc.

Information about benefits associated with the user's payment methods can be collected and stored. For example, the user may have multiple cards such as a card for building credit, a cash back rewards card, a travel rewards card, etc. Some cards may have new member offers, low introductory rates, business rewards, or special promotions. Some cards may have benefits such as cash back, travel rewards, statement credit, gift cards, reduced fees, access to a higher credit line, balance transfers, insurance, discounts, travel miles, transferring miles, extended warranties, tickets, and other benefits and services. Information about the rules for earning benefits can be collected and stored for the purpose of tracking and managing benefits on behalf of the user. The user can add preferences for various benefits through the user interface.

At block 304, conditions for potential benefits for the user can be matched to transactions for the set of payment methods associated with the user, after collecting and storing the user's payment methods, data about how the user is spending their money, and information about benefits associated with the user's payment methods. A backend application can query a database for transactions associated with the user's payment methods. The resulting transactions can be processed to track and manage benefits on behalf of the user. The user interface can display benefit tracking and management information and options. A browser extension can provide information about a potential transaction to the backend application and, in response, the backend application can use the potential transaction along with the benefit tracking and management information from past transaction to calculate how each of the user's payment methods would benefit the user and select the best one for the user as a recommendation. This recommendation can be provided to the browser extension. The frontend application can request the recommended payment method from the backend application and then provide the recommendation to the browser extension and/or browser. The recommendation can be stored in a cache on the user's device for access by the browser extension. The browser extension can display the recommended payment method on the user's device at the point of sale.

At block 306, a recommended payment method can be determined that maximizes the potential benefits for the user. For example, the user can be on the Amazon® shopping application and about to buy something in the cart. The browser extension can access the cache for pre-populated recommendations for Amazon®. When the user goes to the checkout page or credit card permission page or something similar, the browser extension can automatically pop up and, based on the user's transactions in the past, recommend the payment method with the best benefits such as a card with a 5% cash back reward for shopping on Amazon®.

The recommended payment method can be generated using a machine learning program, predictive model, or any other technique for artificial intelligence, data mining, statistical analysis, finding patterns in data, and data science. The recommended payment method can optimize various goals and objectives as benefits for the user such as maximizing spend potential. Spend potential can be maximized by analyzing the transactions and the potential points of sale. Most users do not maximize their spend potential to reap the rewards because they fail to track and manage potential benefits. Providing this service to track and manage potential benefits will allow more users to maximize spend potential and earn more rewards. Artificial intelligence can aid users by processing large amounts of information such as the rules for benefits programs and transaction data and provide useful information in a timely manner.

At block 308, a virtual number can be generated for the recommended payment method so that the user receives, for example, a 5% cash back reward for shopping on Amazon®. The browser extension can request the virtual number from the frontend or backend application on the server and the application can generate the virtual number and provide it to the browser extension in response to the request. In anticipation of using a virtual number for the recommended payment method, the virtual number information can be stored in a cache on the user device or a database accessible by the server for quick access. The virtual number can be provided as an option for the user to select on the pop-up display of the recommended payment method. Virtual numbers can help prevent fraud and enhance security for users.

At block 310, an API can be provided for making recommendations to the user at a point of sale to provide the recommended payment method and virtual number to the user. Method 300 ends at block 312. The API can be, for example, the pop-up display by the browser extension for the user shopping on Amazon®. The API can be one or more of any kind of user interface on the user device, such as a mobile or web application. If the user was shopping on an Amazon® application, the user can be automatically redirected to another application or website to provide the recommended payment method and virtual number or a push notification could be displayed so that if the user selects the push notification then the user can be similarly redirected. The user can decide not to use the recommended payment method provided by the API. The API can allow a way for the user to choose a different payment method. The API can generate a virtual number for the chosen payment method. The choice to use a payment method different than the recommended payment method can be used to retrain or refine the predictive model or machine learning algorithm that generates the recommended payment method.

Figure 4:
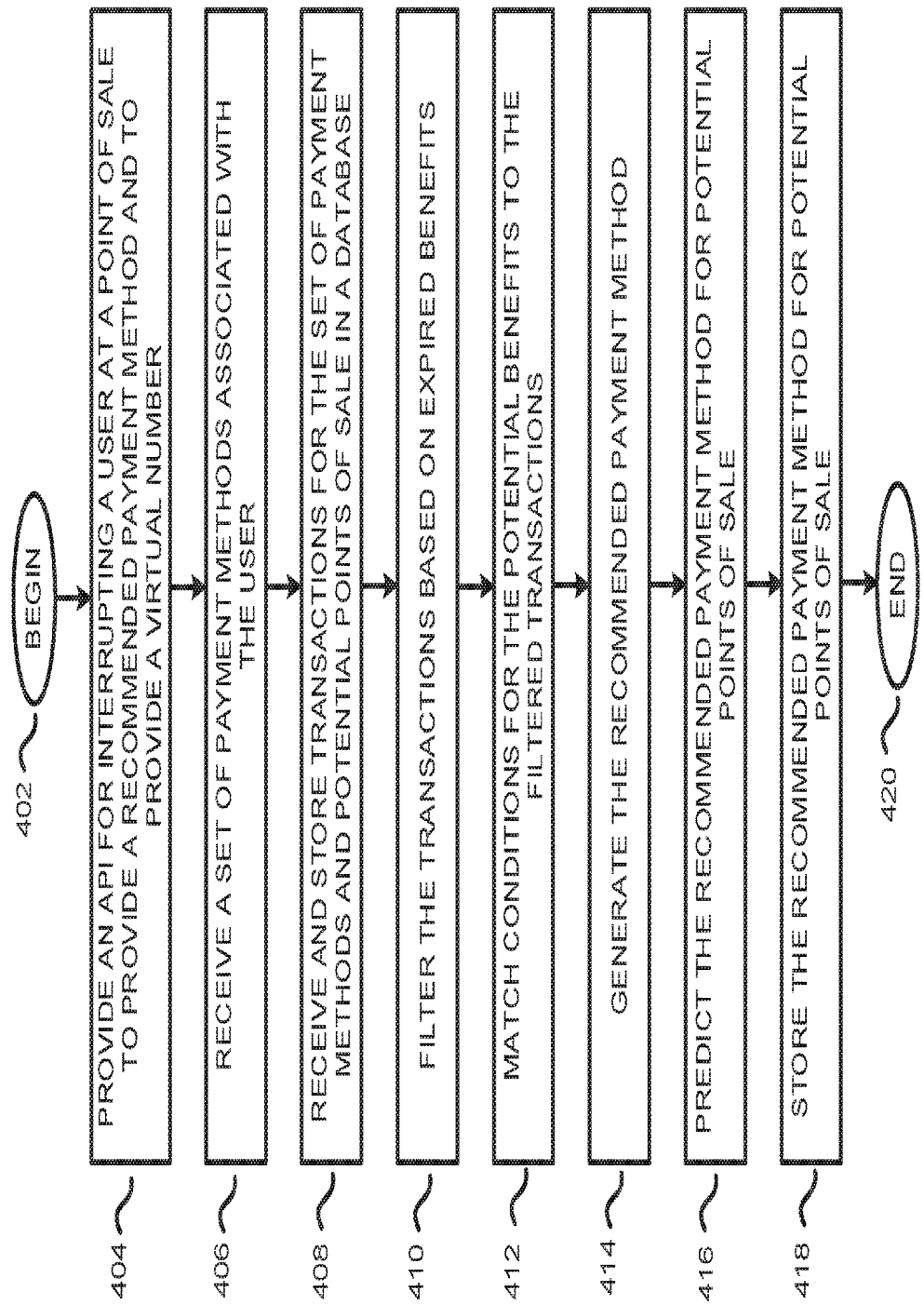
FIG. 4 is a flow chart of a method for making a recommendation to a user for payment methods, according to an example embodiment of the disclosure.

FIG. 4 is a flow chart of a method 400 for making recommendations to a user for payment methods, according to an example embodiment of the disclosure. Method 400 begins at block 402. At block 404, an API can be provided for making recommendations to a user at a point of sale to provide a recommended payment method and to provide a virtual number. The API can be part of a browser extension that recognizes that the user is about the make a payment and recommend how the user might make that payment. The virtual number can be secure so that it is only valid for a particular transaction with a particular vendor for a particular purchase price. If the user is at a travel-related website, the browser extension can suggest the best payment method with travel-related benefits. If the user frequently visits the travel-related website and has used a particular virtual number in the past, that same virtual number or a new one can be provided. The API can be part of a user interface on a mobile device. As the user is walking around with the mobile device, location data can be used to determine that the user is at a point of sale and recommend a payment method. For example, the user interface can recommend that the user pay in cash because that a restaurant has a 3% credit card surcharge and it will cost the user $10 to pay in cash or $13 to pay with a credit card. The user interface can recommend the form of payment based on things that the user enjoys, whether it is cost savings, supporting merchants or charities, or other benefits. The user can opt to pay with the recommended method or choose a different payment method.

At block 406, a set of payment methods associated with the user can be received. The user interface, browser extension, frontend server and/or backend server can collect payment methods from many sources such as the user, financial entities, financial websites and/or a database. The collected payment methods can be stored in a cache and/or database and displayed on a user interface or website for tracking and managing payment methods and their benefits.

At block 408, transactions for the set of payment methods and potential points of sale can be received and stored in a database. The frontend or backend server can determine which transactions in the database are relevant for the user's payment methods and benefits and set them aside for further processing. The browser, browser extension, background script, and/or frontend or backend server can determine potential points of sale from various sources such as browser history, tracking information, past transactions, payment methods, and benefit rules.

At block 410, the transactions can be filtered based on expired benefits. At block 412, conditions for the potential benefits can be matched to the filtered transactions. Selected transactions can be chosen as input to a machine learning program, predictive model, or other program. In order to optimize the benefits for the user, not all transactions associated with the user's payment methods may be relevant to recommending the best payment method. In fact, some stored transactions may be misleading or produce unwanted results. The transactions can be filtered based on one or more expired time periods of potential benefits to the user and then the filtered transactions can be selectively provided as input to the machine learning program. For example, a travel card may award 50,000 miles if a new card holder spends $5,000 within three months. During the initial three months, the travel card may be recommended to help the user reach the maximum spend of $5,000. The user interface tracking and managing benefits can show progress towards the goal, such as how much has been spent so far and how much more needs to be spent in what period of time. After the initial three month period when the 50,000 miles are no longer an available benefit, the transactions using the travel card during the first three months can be ignored by a predictive model. The predictive model can recommend the travel card in normal ways given the current conditions, ignoring the expired benefit. Generic transactions from other sources can be used in place of misleading transactions. The user interface tracking and managing benefits can reflect changing conditions for benefits. When conditions for benefits change, transaction and other data can be refreshed and/or manipulated and predictive models can be retrained so that the latest and best recommendations are provided to the user.

At block 414, the recommended payment method can be generated. Payment method recommendations can maximize discounts, rewards, or other benefits or can be using payment methods that align with the user's values. If the user navigates to a donation page for a non-profit, the browser extension can pop-up a display recommending a debit card because it has a lower interchange rate so that the non-profit receives more of the donation. Based on the user's transaction history, the browser extension can create or update a profile for the user indicating an interest in the causes supported by the non-profit. The browser extension can recommend using a bank account number to do an Automated Clearing House (ACH) payment for donations. The browser extension can recommend using a payment method that has a benefit of donating a certain percentage of the sale to a non-profit that the user enjoys.

At block 416, the recommended payment method for potential points of sale can be predicted. The recommended payment method can be predicted and stored for one or more potential points of sale to be ready when the user is at a point of sale and the user interface makes recommendations to the user and can provide the recommended payment method. Potential points of sale can be provided by the user. Stored transactions, benefit rules and other information can be mined for potential points of sale. When the user navigates in the browser to an airline website, a background script that is part of the browser extension can make an API call to the backend server that passes the information about the airline website to the backend server. The background script can be running in the background and communicating with the browser about open tabs, session information and other information about the user. The backend server can figure out which payment method to recommend for that airline website and have the recommendation cached and ready for the background script so that when the user is about to decide on a payment method, the browser extension can provide the recommended payment method in a pop-up display.

At block 418, the recommended payment method for potential points of sale can be stored in the cache on the user device and/or the database accessible by the backend server. Method 400 ends at block 420.

An example embodiment of the present disclosure can be a non-transitory computer-accessible medium having stored thereon computer-executable instructions for making recommendations to a user at a point of sale, wherein upon execution by a computer arrangement comprising a processor, the instructions cause the computer arrangement to perform a method. The method can provide an application programming interface that makes recommendations to a user at a point of sale to provide a recommended payment method and to provide a virtual number. The recommended payment method can maximizes the potential benefits to the user. The potential benefits can be selected from one or more of: a number of reward points, a number of airline miles, a donation to a charity, or an interest rate. The component can be configured to receive a set of payment methods associated with the user. The set of payment methods can be selected from one or more of: a credit card, a bank account, cash, a check, or a debit card. The component can receive and store transactions for the set of payment methods and potential points of sale in a database. The component can filter the transactions based on one or more expired time periods of potential benefits to the user. The component can match conditions for the potential benefits to the filtered transactions by using a machine learning program. The component can generate the recommended payment method by using the machine learning program to maximize spend potential. The component can predict the recommended payment method for the potential points of sale using the machine learning program to maximize spend potential. The component can store the recommended payment method for the potential points of sale.

Figure 5A:
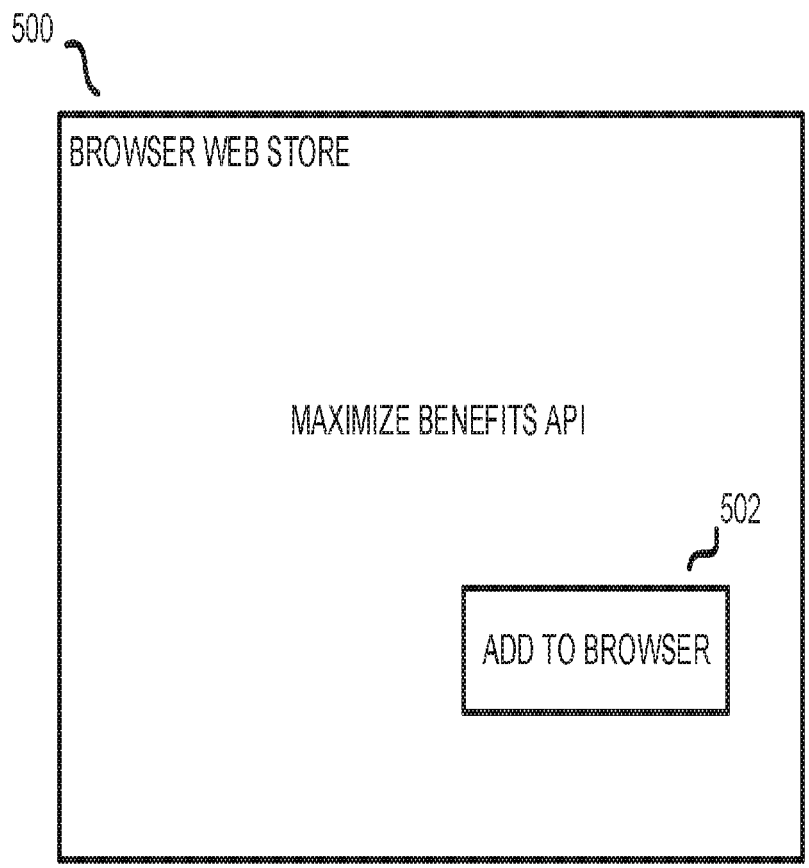
FIGS. 5A-5G diagrams of user interfaces for making a recommendation to a user for payment methods, according to an example embodiment of the disclosure.
Figure 5B:
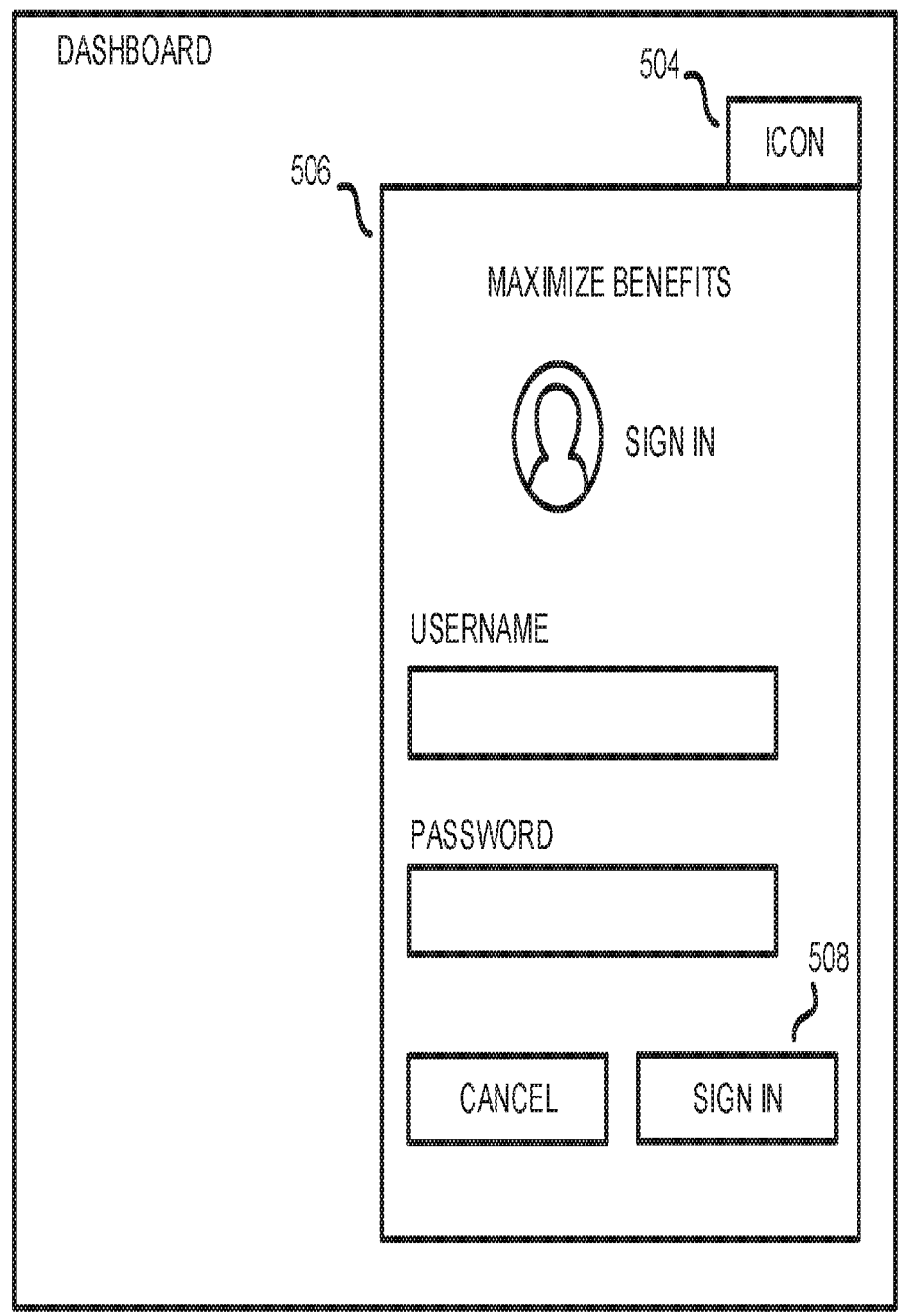

FIGS. 5A-5G diagrams of user interfaces for making recommendations to a user for payment methods, according to an example embodiment of the disclosure. In FIG. 5A, a browser web store 500 provides a button 502 to add a maximize benefits API to the browser. Browser web store 500 can be displayed in a browser on the user device and selecting button 502 can install a browser extension for the maximize benefits API on the user device. FIG. 5B shows a user interface that can be displayed, after the user selects button 502 to add the maximize benefits API to the browser. In FIG. 5B, an icon 504 and pop-up display 506 for the maximize benefits API is displayed with a sign in screen having a sign in button 508. When the user enters the sign in information and selects sign in button 508, FIG. 5C can be displayed.

Figure 5C:
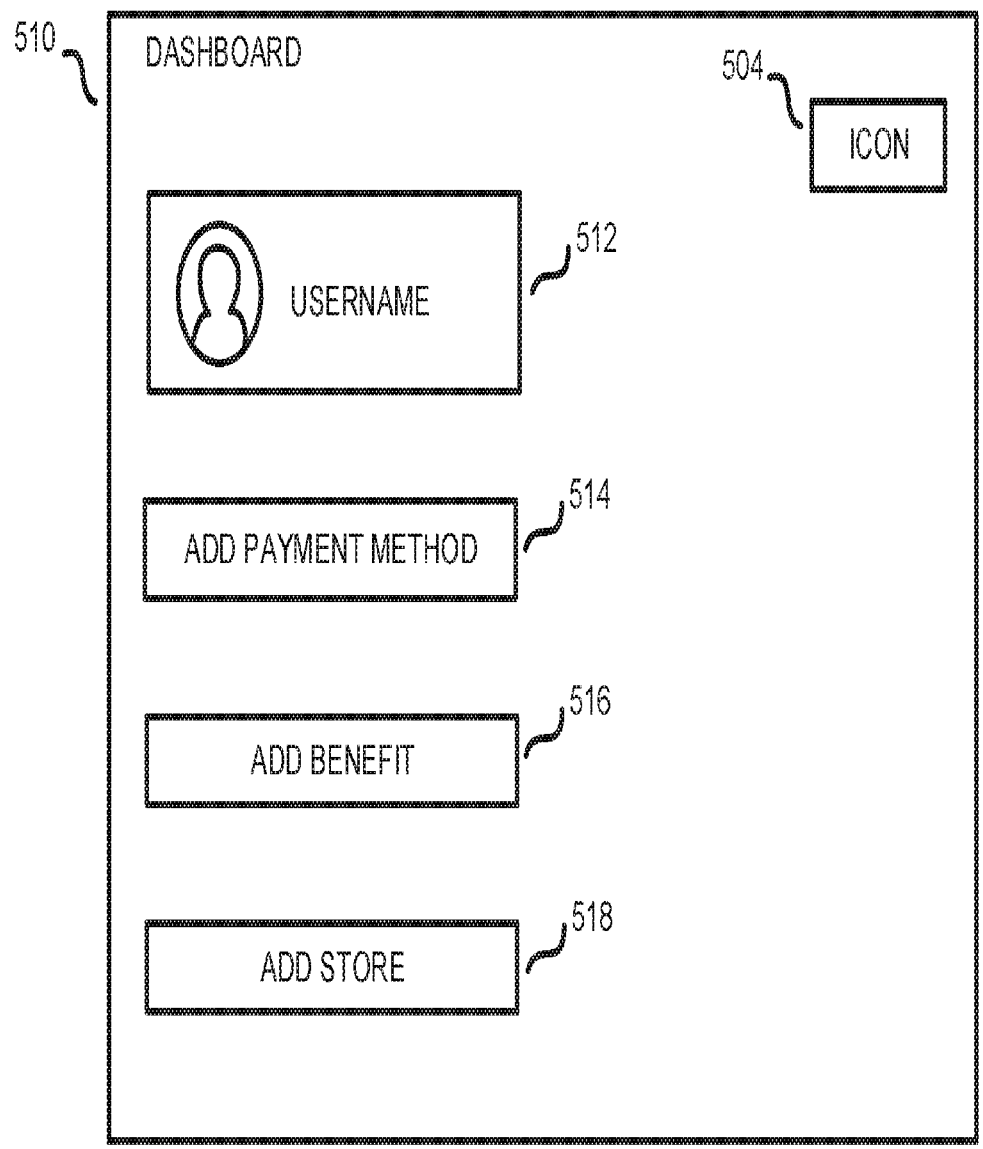

A website associated with the maximize benefits API can be displayed in a browser on the user device. In FIG. 5C, a dashboard 510 can have a username 512 identifying the user who signed in on FIG. 5B. Dashboard 510 can have buttons to add payment method 514, add benefit 516, and add store 518 where the payment methods and benefits may be used. If the user selects add payment method 514, the browser extension can request that the frontend application associate a set of payment methods with the user. The frontend application or browser extension can request that the backend application retrieve payment methods for the user from the database. The payment methods can be retrieved by the browser extension, frontend application, and/or backend application automatically, without user input.

Figure 5D:
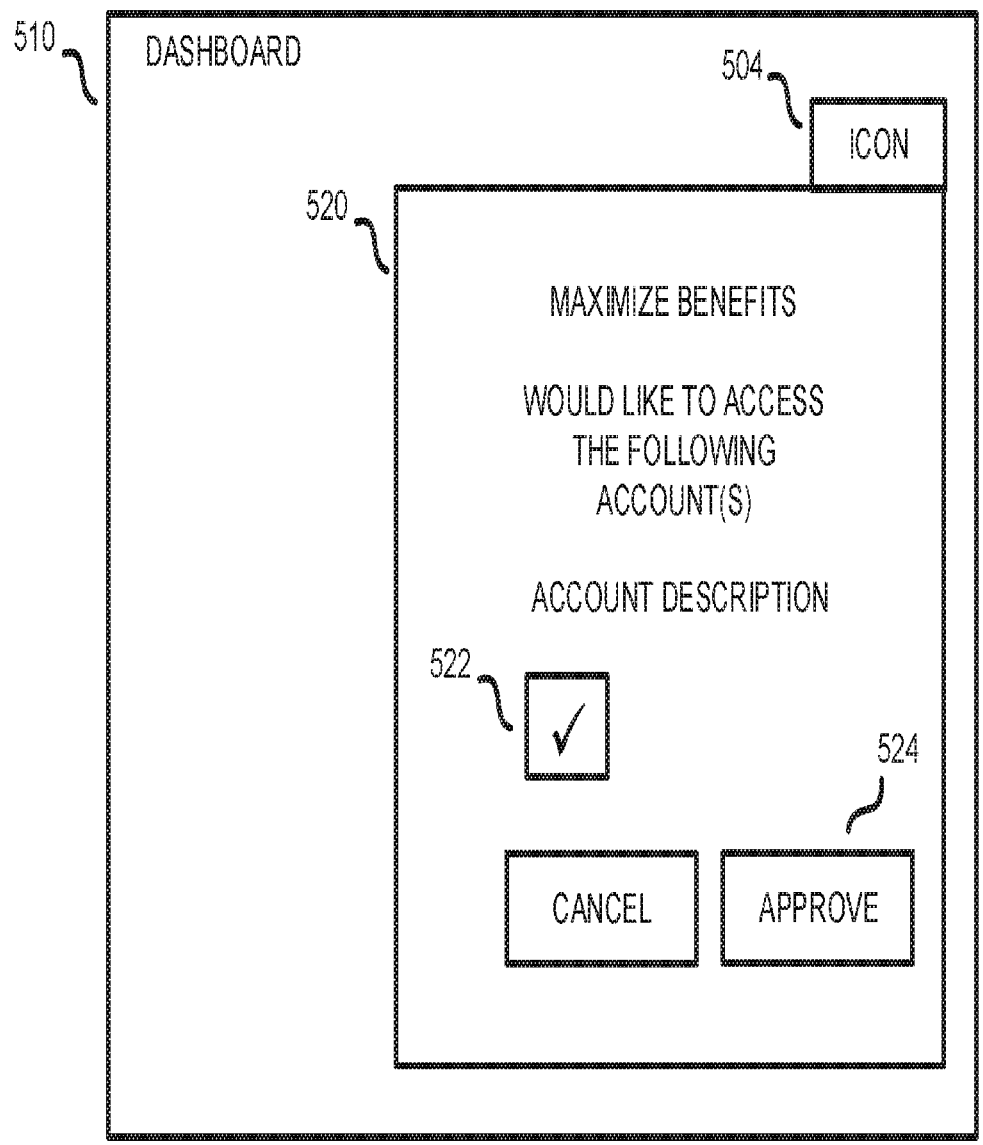

FIG. 5D shows a pop-up 520 that can be displayed to automatically add payment methods for the user. For example, upon selecting icon 504, the payment methods can be automatically retrieved and displayed on pop-up 520. Pop-up 520 can display one or more or the user's payment methods for selection 522 and/or approval 524.

Figure 5E:
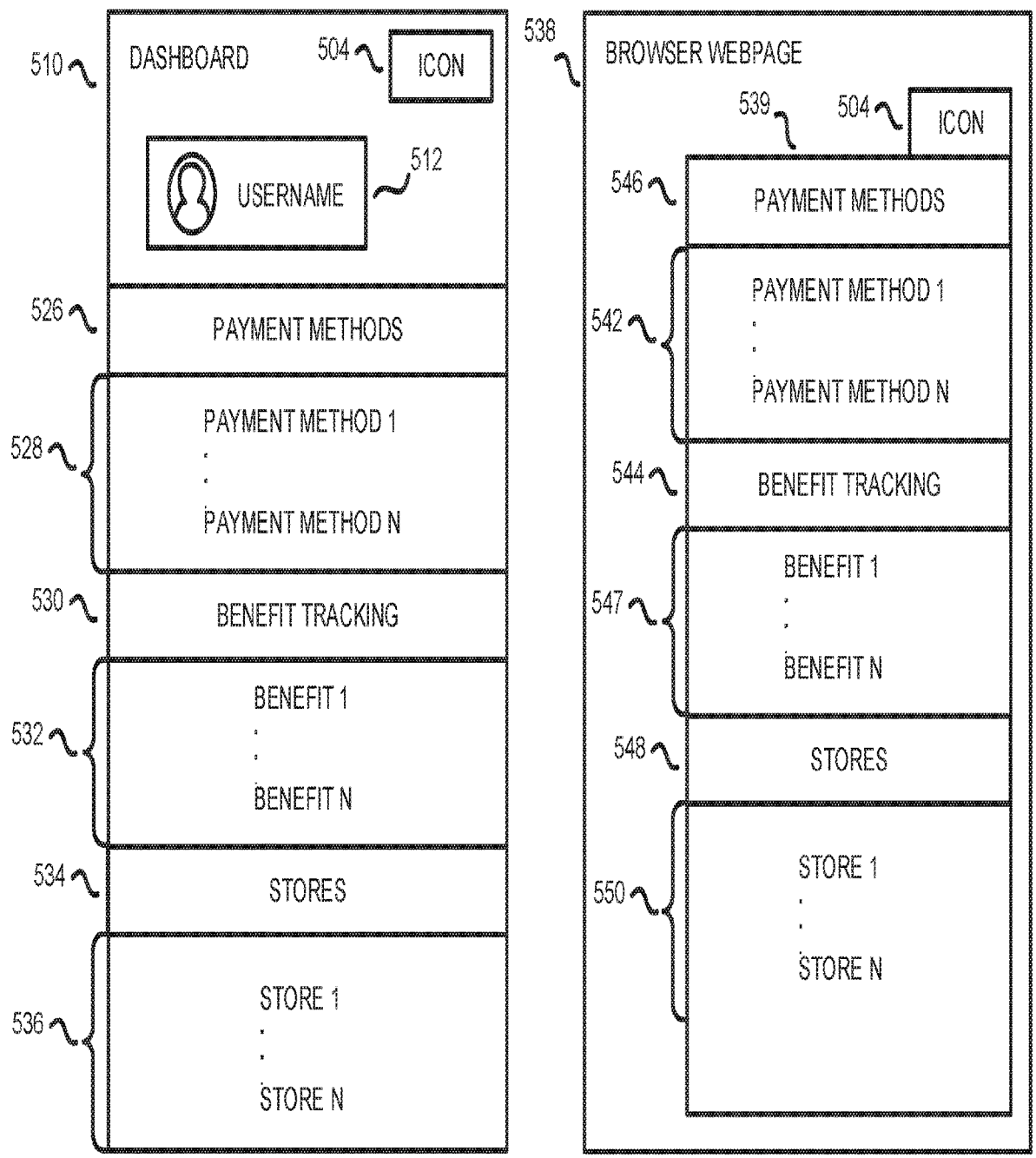

FIG. 5E shows how information about the user can be displayed either on dashboard 510 on a website or on pop-up 539 overlaying browser webpage 538. As part of a website for tracking and managing benefits, dashboard 510 can display sections for payment methods 526, benefit tracking 530, and stores 534. Payment methods 526 can list any number of payment methods 528. Benefit tracking 530 can list benefits associated with payment methods 528, stores 536, and/or the user. Stores 534 can list any number of stores 536 where payment methods 528 may be used or benefits 532 may be earned. Dashboard 510 can include additional displays facilitating tracking and managing benefits such as showing progress towards a spending goal to earn rewards or points.

Similarly, pop-up 539 can display sections for payment methods 546, benefit tracking 544, and stores 548 overlaying browser webpage 538. Payment methods 546 can list any number of payment methods 542. Benefit tracking 544 can list benefits associated with payment methods 546, stores 548, and/or the user. Stores 548 can list any number of stores 550 where payment methods 546 may be used or benefits 547 may be earned.

Figure 5F:
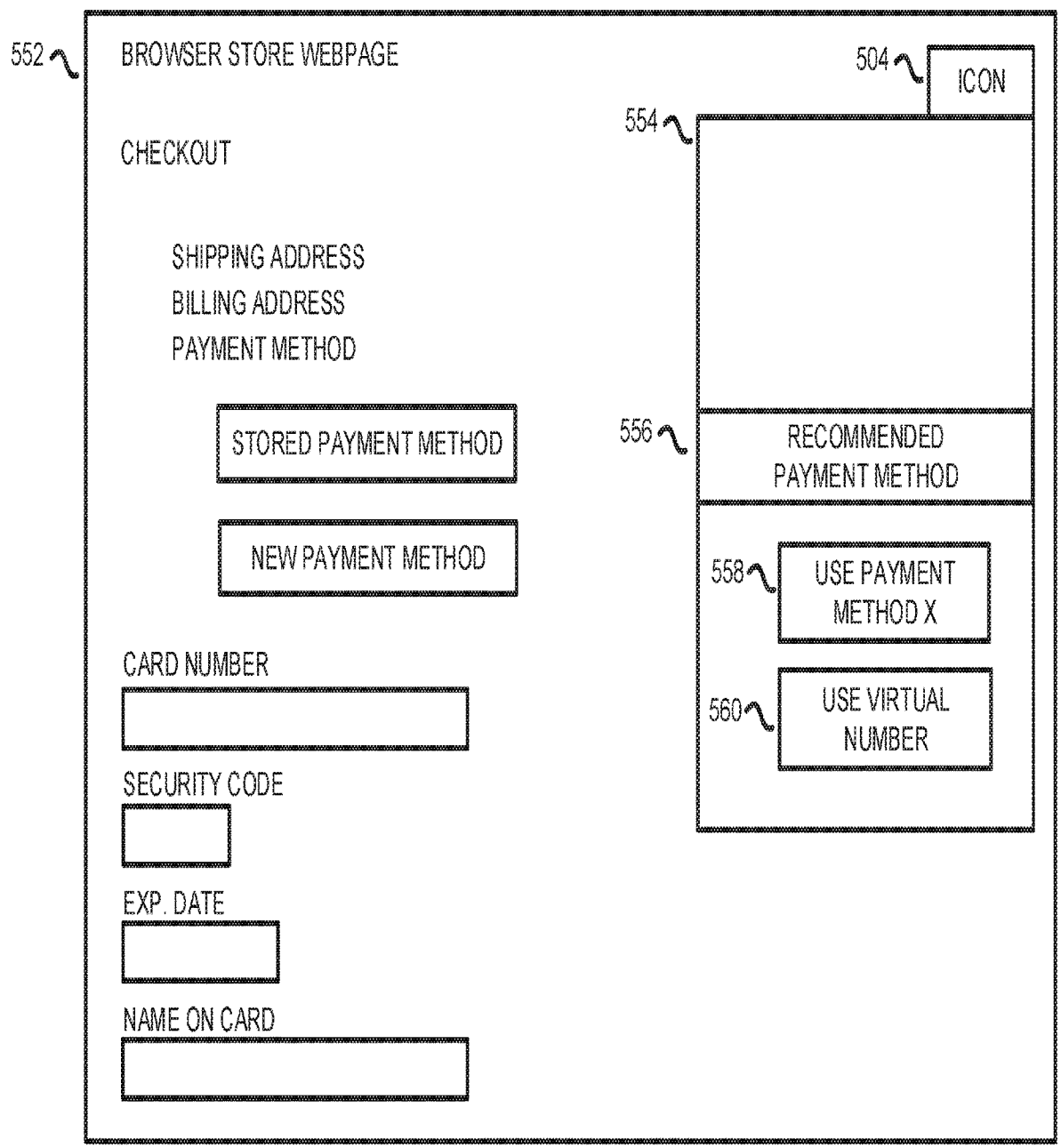
Figure 5G:
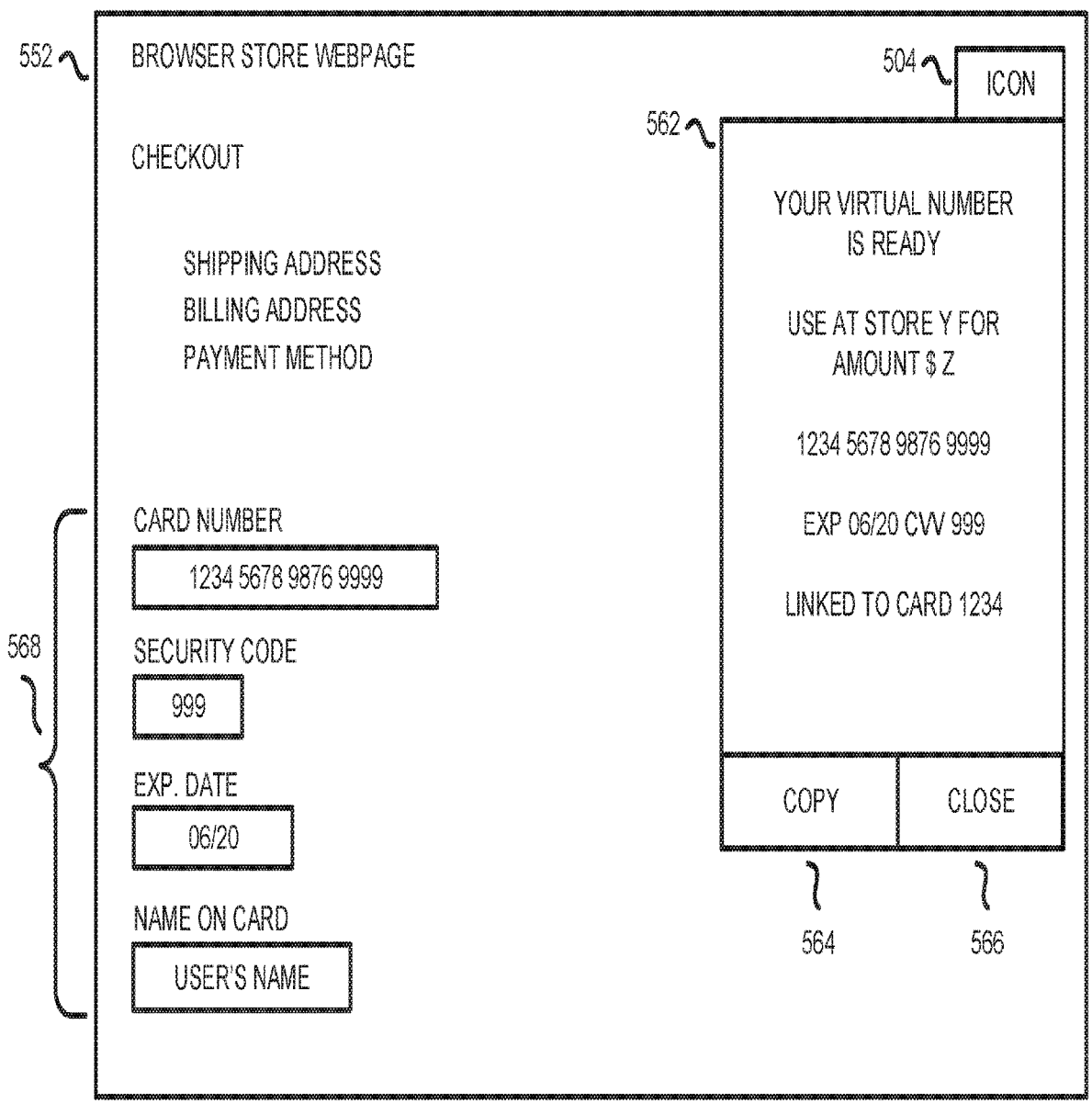

In FIG. 5F, the user is on a browser store webpage 552 at a point of sale where a payment method may be needed. A pop-up 554 can be displayed by the browser extension to recommend a payment method that best benefits the user. Pop-up 554 can display a recommended payment method 556 and provide buttons to use the recommended payment method 558 and/or a virtual number 560 for the recommended payment method. The user can decide to use a different payment method on the browser store webpage. If the user chooses to use the recommended payment method 556 and/or virtual number 560, the browser extension can automatically fill-in fields on browser store webpage 552 for the payment method. As shown in FIG. 5G, a virtual number pop-up 562 can prompt the user to copy the virtual number information to browser store webpage 552.

In this description, numerous specific details have been set forth. It is to be understood, however, that implementations of the disclosed technology can be practiced without these specific details. In other instances, well-known methods, structures and techniques have not been shown in detail in order not to obscure an understanding of this description. References to "some examples," "other examples," "one example," "an example," "various examples," "one embodiment," "an embodiment," "some embodiments," "example embodiment," "various embodiments," "one implementation," "an implementation," "example implementation," "various implementations," "some implementations," etc., indicate that the implementation(s) of the disclosed technology so described can include a particular feature, structure, or characteristic, but not every implementation necessarily includes the particular feature, structure, or characteristic. Further, repeated use of the phrases "in one example," "in one embodiment," or "in one implementation" does not necessarily refer to the same example, embodiment, or implementation, although it could.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising a computer server, wherein the computer server is configured to:
    apply a browser extension to a web browser running on a user device, the browser extension configured to:
        monitor activity on the web browser;
        apply a predictive model configured to predict when a user is at a point of sale on a merchant web displayed on the web browser page based on the monitored activity; and
        collect and send a payment request from the predicted point of sale to a backend server;
    receive, by the backend server, the payment request from a point of sale;
    identify, by the backend server, a payment request payment method based on comparison of payment information included in the payment request with payment information associated with each respective payment method of a set of payment methods associated with a user;
    filter, by the backend server, one or more past transactions stored in a database for each payment method based on one or more expired time periods of potential benefits to the user to yield one or more filtered past transactions and one or more unwanted results;
    generate payment analytics with the predictive model to analyze the one or more filtered past transactions stored in the database for each payment method;
    determine, by the backend server, potential benefits available to the user;
    determine, by the backend server, a recommended payment method by using the payment analytics and maximizing the potential benefits available to the user;
    generate, by the backend server, a unique virtual number for the recommended payment method;
    intercept, by the browser extension, by accessing data of the point of sale displayed on the browser and, by the browser extension, display the recommended payment method, including the unique virtual number to the user in selectable interface;
    receive, through the browser extension, a user choice of a payment method from the set of payment methods;
    retrieve, from the database, one or more generic transactions from a set of generic transactions for each of the unwanted results; and
    train the predictive model based on the one or more filtered past transactions, the one or more generic transactions, and the user choice.

2. The system of claim 1, wherein:
    the one or more filtered past transactions correspond to one or more past transactions selected by the filter, and
    the one or more unwanted results correspond to one or more past transactions removed by the filter.

3. The system of claim 1, wherein the server is further configured to process the payment request using the payment request payment method if the recommended payment method is the same as the payment request payment method.

4. The system of claim 1, wherein the server is further configured to transmit to the point of sale an indication to be displayed to the user by the point of sale that the recommended payment method is different than the payment request payment method if the recommended payment method is the different than the payment request payment method.

5. The system of claim 1, wherein the recommended payment method includes a virtual number.

6. The system of claim 5, wherein the virtual number is limited to use with a particular vendor.

7. The system of claim 1, wherein the set of payment methods is selected from one or more of: (i) a credit card, (ii) a bank account, (iii) cash, (iv) a check, or (v) a debit card.

8. The system of claim 1, wherein the potential benefits available to the user are selected from one or more of: a number of reward points, cash back, a number of airline miles, a donation to a charity, or an interest rate.

9. A non-transitory computer-accessible medium having stored thereon computer-executable instructions for making a recommendation to a user at a point of sale, wherein upon execution by a computer arrangement comprising a processor, the instructions cause the computer arrangement to perform procedures comprising:
    applying a browser extension to a web browser running on a user device, the browser extension configured to:

monitor activity on the web browser;
apply a predictive model configured to predict when a user is at a point of sale on a merchant web displayed on the web browser page based on the monitored activity; and
collect and send a payment request from the predicted point of sale to a backend server;
receiving, by the backend server, the payment request from the point of sale;
identifying, by the backend server, a payment request payment method based on comparison of payment information included in the payment request with payment information associated with each respective payment method of a set of payment methods associated with a user;
filtering, by the backend server, one or more past transactions stored in a database for each payment method based on one or more expired time periods of potential benefits to the user to yield one or more filtered past transactions and one or more unwanted results;
generating payment analytics with the predictive model to analyze the one or more filtered past transactions stored in the database for each payment method;
determining, by the backend server, potential benefits available to the user;
determining, by the backend server, a recommended payment method by using the payment analytics and maximizing the potential benefits available to the user;
generating, by the backend server, a unique virtual number for the recommended payment method;
intercepting, by the browser extension, by accessing data of the point of sale displayed on the browser and, by the browser extension, display the recommended payment method, including the unique virtual number to the user in selectable interface;
receiving, through the browser extension, a user choice of a payment method from the set of payment methods;
retrieving, from the database, one or more generic transactions from a set of generic transactions for each of the unwanted results; and
training the predictive model based on the one or more filtered past transactions, the one or more generic transactions, and the user choice.

10. The non-transitory computer-accessible medium of claim 9, wherein the procedures further comprising:
training the predictive model using information about the user and one or more predetermined recommended payment methods associated with one or more websites;
processing the payment request using the payment request payment method if the recommended payment method is the same as the payment request payment method; and
transmitting, to the point of sale, an indication to be displayed to the user by the point of sale that the recommended payment method is different than the payment request payment method if the recommended payment method is the different than the payment request payment method.

11. The non-transitory computer-accessible medium of claim 9, the procedures further comprising:
identifying a previously-used virtual number associated with the user and one or more websites; and
associating the previously-used virtual number with the recommended payment method.

* * * * *